US010298289B2

(12) United States Patent
Yerramalli et al.

(10) Patent No.: US 10,298,289 B2
(45) Date of Patent: May 21, 2019

(54) SYNCHRONIZATION AND PAGING CHANNEL DESIGN FOR WIRELESS COMMUNICATIONS

(71) Applicant: QUALCOMM Incorporated, San Diego, CA (US)

(72) Inventors: Srinivas Yerramalli, San Diego, CA (US); Tamer Kadous, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/854,380

(22) Filed: Dec. 26, 2017

(65) Prior Publication Data
US 2018/0309479 A1    Oct. 25, 2018

Related U.S. Application Data

(60) Provisional application No. 62/487,421, filed on Apr. 19, 2017.

(51) Int. Cl.
*H04B 1/7143* (2011.01)
*H04W 8/00* (2009.01)
*H04L 5/00* (2006.01)
*H04W 16/14* (2009.01)
*H04L 27/00* (2006.01)
*H04J 3/00* (2006.01)
*H04W 16/10* (2009.01)
*H04W 48/12* (2009.01)

(52) U.S. Cl.
CPC ......... *H04B 1/7143* (2013.01); *H04L 5/0012* (2013.01); *H04L 5/0055* (2013.01); *H04L 5/0092* (2013.01); *H04L 27/0006* (2013.01); *H04W 8/005* (2013.01); *H04W 16/14* (2013.01); *H04J 3/00* (2013.01); *H04W 16/10* (2013.01); *H04W 48/12* (2013.01)

(58) Field of Classification Search
CPC .............................. H04B 1/713; H04B 1/7143
USPC ........................................................ 375/132
See application file for complete search history.

(56) References Cited

U.S. PATENT DOCUMENTS

2015/0043523 A1\*   2/2015   Luo ....................... H04W 16/14
                                                                 370/330

OTHER PUBLICATIONS

International Search Report and Written Opinion—PCT/US2018/027881—ISA/EPO—dated Jul. 4, 2018.

\* cited by examiner

*Primary Examiner* — Kevin Kim
(74) *Attorney, Agent, or Firm* — Holland & Hart LLP

(57) ABSTRACT

Methods, systems, and devices for wireless communication are described that provide for a base station to use frequency hopping for cell acquisition according to a frequency hopping pattern. The frequency hopping pattern may include a set of anchor channels and a set of non-anchor channels used by a base station to communicate with wireless devices. The base station may occupy an anchor channel more often than a non-anchor channel and may transmit acquisition signals using the anchor channel. The anchor channel may also be used by the base station and a user equipment (UE) to exchange paging information, positioning information, random access resources, location of other channels, etc.

30 Claims, 12 Drawing Sheets

SYNCHRONIZATION AND PAGING CHANNEL DESIGN FOR WIRELESS COMMUNICATIONS

CROSS REFERENCES

The present Application for Patent claims priority to U.S. Provisional Patent Application No. 62/487,421 by Yerramalli, et al., entitled "Synchronization and Paging Channel Design For Wireless Communications," filed Apr. 19, 2017, assigned to the assignee hereof.

BACKGROUND

The following relates generally to wireless communication, and more specifically to synchronization and paging channel design for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless systems may enable communication between a base station and a UE over different radio frequency spectrum bands (e.g., shared radio frequency spectrum bands, licensed radio frequency spectrum bands, or unlicensed radio frequency spectrum bands). When initially performing cell acquisition, or when identifying one or more neighbor cells when connected with a serving cell, a UE may identify one or more discovery reference signal (DRS) transmissions from a base station. DRS transmission may include a primary synchronization signal (PSS), a secondary synchronization signal (SSS), a physical broadcast channel (PBCH), etc. Using the DRS transmissions may allow the UE to synchronize and communicate with the base station.

When operating over a shared radio frequency spectrum, transmitters may have limitations on the use of the spectrum and may or may not be transmitting when a UE may be trying to locate a synchronization signal. Such limitations may result in additional delays during a cell acquisition procedure. Long cell acquisition times may decrease device performance, increase power consumption, and in low signal to noise ratio (SNR) environments, communication between the mobile device and the base station may be deleteriously affected. Improved techniques for cell acquisition in such scenarios may thus be desired.

SUMMARY

The described techniques relate to improved methods, systems, devices, or apparatuses that support synchronization and paging channel design for wireless communications. Generally, the described techniques provide for a base station to use frequency hopping for cell acquisition according to a frequency hopping pattern. In some aspects, a base station may utilize multiple channels such as an anchor channel and one or more non-anchor channels (e.g., hopping frequencies) in order to communicate with one or more user equipment (UE). For example, a base station may communicate using an anchor channel during a first channel occupancy time and may communicate using a non-anchor channel during a second channel occupancy time. The first and second channel occupancy times may span different durations in time and may allow include separate time intervals for downlink transmission, uplink transmissions, or both.

A base station may perform communications according the frequency hopping pattern such that within a given frequency hopping interval, the base station may operate using the anchor channel more often than a non-anchor channel. For instance, the base station may perform communications on an anchor channel, then perform communications on a non-anchor channel and thereafter revisit the anchor channel to perform communications again. Using the anchor channel, for example, the base station may transmit discovery reference signals (DRSs), paging information, random access resources, locations of other channels (e.g., other anchor or non-anchor channels), an occupancy duration for a given channel, a bandwidth of one or more anchor or non-anchor channels, etc.

In some examples, the non-anchor channels of the frequency hopping pattern may be randomly or pseudo randomly selected (e.g., by the base station or another network node). The frequency hopping pattern may include a number of hopping channels or frequencies or a hopping frequency separation (e.g., minimum or maximum hopping frequency separation (in MHz)). Within a frequency hopping interval, a base station may perform communication on each non-anchor channel at least once and may also perform communication via one or more anchor channels multiple times. The duration of communication over the anchor channel may be less than the duration of communication over a non-anchor channel and in some instances, the base station may determine a probability of occupying an anchor channel or a set of non-anchor channels. For example, a base station may determine to occupy an anchor channel fSPEC or 25% of the frequency hopping interval, while occupying a set of non-anchor channels for 75% of the frequency hopping interval.

According to aspects, a base station may vary the transmission power or the power spectral density (PSD) for different channels. For instance, the base station may transmit signals on an anchor channel at a transmission power higher than a transmission power for set of non-anchor channels. Multiple base stations may perform communications using the same anchor channel and set of non-anchor channels in accordance with a time division multiplexing (TDM) scheme. In some cases, communications from multiple base stations on a given channel may overlap. Further, based on communications over the anchor channel, a base station may perform radio resource management (RRM) (e.g., based on network traffic or neighboring cell measurements) or may coordinate handover or other mobility operations with another base station.

A method of wireless communication is described. The method may include identifying a frequency hopping pattern comprising a plurality of hopping frequencies, the plurality of hopping frequencies comprising an anchor channel frequency and a set of non-anchor channel frequencies and performing a plurality of transmissions over the plurality of hopping frequencies during a hopping interval based at least in part on the frequency hopping pattern, wherein the plurality of transmissions comprise a first number of DRS transmissions sent on the anchor channel frequency and a second number of transmissions sent on each non-anchor channel frequency, the first number being greater than or equal to the second number.

An apparatus for wireless communication is described. The apparatus may include means for identifying a frequency hopping pattern comprising a plurality of hopping frequencies, the plurality of hopping frequencies comprising an anchor channel frequency and a set of non-anchor channel frequencies and means for performing a plurality of transmissions over the plurality of hopping frequencies during a hopping interval based at least in part on the frequency hopping pattern, wherein the plurality of transmissions comprise a first number of DRS transmissions sent on the anchor channel frequency and a second number of transmissions sent on each non-anchor channel frequency, the first number being greater than or equal to the second number.

Another apparatus for wireless communication is described. The apparatus may include a processor, memory in electronic communication with the processor, and instructions stored in the memory. The instructions may be operable to cause the processor to identify a frequency hopping pattern comprising a plurality of hopping frequencies, the plurality of hopping frequencies comprising an anchor channel frequency and a set of non-anchor channel frequencies and perform a plurality of transmissions over the plurality of hopping frequencies during a hopping interval based at least in part on the frequency hopping pattern, wherein the plurality of transmissions comprise a first number of DRS transmissions sent on the anchor channel frequency and a second number of transmissions sent on each non-anchor channel frequency, the first number being greater than or equal to the second number.

A non-transitory computer readable medium for wireless communication is described. The non-transitory computer-readable medium may include instructions operable to cause a processor to identify a frequency hopping pattern comprising a plurality of hopping frequencies, the plurality of hopping frequencies comprising an anchor channel frequency and a set of non-anchor channel frequencies and perform a plurality of transmissions over the plurality of hopping frequencies during a hopping interval based at least in part on the frequency hopping pattern, wherein the plurality of transmissions comprise a first number of DRS transmissions sent on the anchor channel frequency and a second number of transmissions sent on each non-anchor channel frequency, the first number being greater than or equal to the second number.

In some examples of the method, apparatus, and non-transitory computer-readable medium described above, performing the plurality of transmissions comprises: performing a DRS transmission on the anchor channel frequency after performing one or more of the second number of transmissions sent on one or more non-anchor channel frequencies.

Some examples of the method, apparatus, and non-transitory computer-readable medium described above may further include processes, features, means, or instructions for determining a probability for occupying the anchor channel frequency within the hopping interval, wherein the probability for occupying the anchor channel frequency may be greater than a probability for occupying a non-anchor channel frequency of the set of non-anchor channel frequencies.

In some examples of the method, apparatus, and non-transitory computer-readable medium described above, performing the plurality of transmissions comprises: performing the first number of DRS transmissions sent on the anchor channel frequency according to a first time division duplexing (TDD) configuration. Some examples of the method, apparatus, and non-transitory computer-readable medium described above may further include processes, features, means, or instructions for performing the second number of transmissions sent on each non-anchor channel frequency according to a second TDD configuration.

Some examples of the method, apparatus, and non-transitory computer-readable medium described above may further include processes, features, means, or instructions for performing a random access procedure with a wireless device using the anchor channel frequency.

In some examples of the method, apparatus, and non-transitory computer-readable medium described above, identifying the frequency hopping pattern further comprises: coordinating the plurality of transmissions with other wireless devices, wherein the coordination may be based at least in part on avoiding collisions on the anchor channel frequency.

In some examples of the method, apparatus, and non-transitory computer-readable medium described above, each of the first number of DRS transmissions comprises at least one of: a primary synchronization signal (PSS), a secondary synchronization signal (SSS), a physical broadcast channel (PBCH), a master information block (MIB), or a system information block (SIB).

In some examples of the method, apparatus, and non-transitory computer-readable medium described above, performing the plurality of transmissions comprises: transmitting a paging message on the anchor channel frequency.

Some examples of the method, apparatus, and non-transitory computer-readable medium described above may further include processes, features, means, or instructions for receiving a paging response from a wireless device on the anchor channel frequency, the paging response based at least in part on the paging message.

In some examples of the method, apparatus, and non-transitory computer-readable medium described above, performing the plurality of transmissions comprises: transmitting, to a wireless device, position information during an uplink time interval on the anchor channel frequency.

Some examples of the method, apparatus, and non-transitory computer-readable medium described above may further include processes, features, means, or instructions for receiving, from a wireless device, position information during a downlink time interval on the anchor channel frequency.

Some examples of the method, apparatus, and non-transitory computer-readable medium described above may further include processes, features, means, or instructions for performing a measurement of a neighboring cell using the anchor channel frequency. Some examples of the method, apparatus, and non-transitory computer-readable medium described above may further include processes, features, means, or instructions for adjusting a RRM parameter based at least in part on the measurement of the neighboring cell.

In some examples of the method, apparatus, and non-transitory computer-readable medium described above, a transmission duration associated with the anchor channel frequency may be less than a transmission duration associated with the set of non-anchor channel frequencies.

Some examples of the method, apparatus, and non-transitory computer-readable medium described above may further include processes, features, means, or instructions for indicating, using transmissions via the anchor channel frequency, at least one non-anchor channel frequency of the set of non-anchor channel frequencies, a hop duration for the at least one non-anchor channel frequency of the set of non-anchor channel frequencies, and a location of the anchor channel frequency with respect to the at least one non-anchor channel frequency of the set of non-anchor channel frequencies.

In some examples of the method, apparatus, and non-transitory computer-readable medium described above, the location of the anchor channel frequency may be based at least in part on whether a listen before talk (LBT) procedure may be performed on a channel prior to the performing transmissions.

In some examples of the method, apparatus, and non-transitory computer-readable medium described above, a channel frequency occupation duration may be based at least in part on whether an LBT procedure may be performed on a channel prior to the performing transmissions.

Some examples of the method, apparatus, and non-transitory computer-readable medium described above may further include processes, features, means, or instructions for performing an LBT prior to performing transmissions sent on a non-anchor channel frequency of the set of non-anchor channel frequencies.

Some examples of the method, apparatus, and non-transitory computer-readable medium described above may further include processes, features, means, or instructions for refraining from performing an LBT prior to performing transmissions sent on the anchor channel frequency.

In some examples of the method, apparatus, and non-transitory computer-readable medium described above, the transmissions performed via the anchor channel frequency comprise an indication of random access channel (RACH) resources.

In some examples of the method, apparatus, and non-transitory computer-readable medium described above, a bandwidth associated with the anchor channel frequency may be less than a bandwidth associated with the set of non-anchor channel frequencies.

In some examples of the method, apparatus, and non-transitory computer-readable medium described above, the bandwidth associated with the anchor channel frequency comprises a guardband.

In some examples of the method, apparatus, and non-transitory computer-readable medium described above, a transmission power associated with the anchor channel frequency may be greater than a transmission power associated with the set of non-anchor channel frequencies.

In some examples of the method, apparatus, and non-transitory computer-readable medium described above, a PSD associated with the anchor channel frequency may be greater than a PSD associated with the set of non-anchor channel frequencies.

In some examples of the method, apparatus, and non-transitory computer-readable medium described above, the anchor channel frequency may be within a radio frequency spectrum band different from the set of non-anchor channel frequencies.

DETAILED DESCRIPTION

Figure 1:
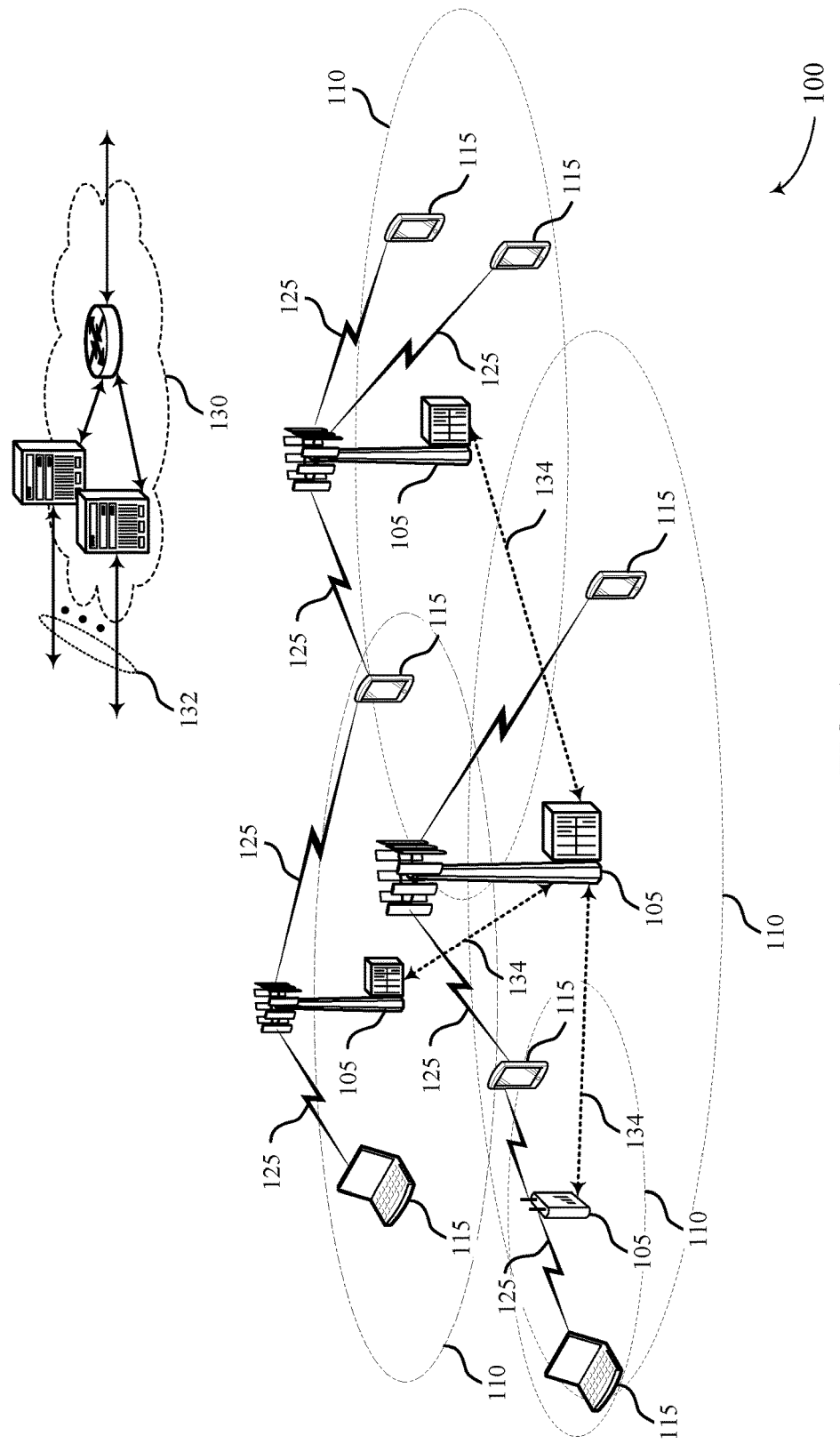
FIG. 1 illustrates an example of a system for wireless communication that supports synchronization and paging channel design for wireless communications in accordance with aspects of the present disclosure.

The described techniques relate to improved methods, systems, devices, or apparatuses that support paging and synchronization techniques using frequency hopping in a radio frequency spectrum such as an unlicensed, shared, or licensed spectrum. Generally, the described techniques provide for transmission of synchronization signals (e.g., discovery reference signal (DRS) transmissions) using anchor channels within a set of frequency hopping channels (e.g., used for other transmissions) in unlicensed or shared radio frequency spectrum.

A wireless device may perform initial system acquisition prior to engaging in communications within wireless systems utilizing unlicensed radio frequency spectrum. For example, a wireless device may perform initial system acquisition by acquiring one or more synchronization signals, determining a system timing and synchronization information, etc. Once a user equipment (UE) has synchronization information (e.g., slot and subframe synchronization associated with a base station), the UE may communicate with the base station.

When using shared radio frequency spectrum, limits may be placed on transmitting wireless devices to prevent any particular transmitter from occupying the spectrum for a disproportionate amount of time. As such, frequency hopping techniques may be employed, for example, to facilitate coexistence with other devices and technologies occupying the spectrum, resulting in reduced channel occupancy time. However, acquiring cell synchronization information may be associated with increased latency in such scenarios, as a wireless device camping on a channel may not receive transmissions until a base station returns to the frequency hopping channel the wireless device is monitoring. That is, a base station may not be transmitting on a particular channel at any particular time, which may result in inefficiencies for a wireless device attempting to perform initial system acquisition. For example, if a base station utilizes a 15 channel frequency hopping pattern, and occupies each channel for 80 ms, the wireless device may necessarily camp on a channel (e.g., awaiting a synchronization signal) for at least 1.2 s before the base station returns to any given channel of the 15 frequency hopping channels.

Further, transmitters may perform listen before talk (LBT) procedures, such as a clear channel assessment (CCA), to verify that no other transmitters are using a channel prior to starting transmissions (e.g., for spectrum coexistence). If a LBT procedure does not clear for a given frequency hopping channel, a base station may skip the channel. In such scenarios, additional delays, and thus additional wireless device camping/monitoring requirements, may result from waiting for additional frequency hopping cycles to commence (e.g., if LBT fails on the channel monitored by the wireless device, the wireless device may wait until the base station cycles back to the monitored channel).

Techniques provided herein may provide improved synchronization and paging channel design for such wireless communications systems. A base station may identify anchor channels within a set of hopping frequencies for paging and transmission of synchronization signals (e.g., DRS transmissions) within a wireless communications system. A wireless device seeking to identify the base station may monitor one or more of the anchor channels to identify one or more synchronization signals. In some cases, an anchor channel (e.g., a particular hop frequency) may be monitored for a duration that may span the periodicity of synchronization signal transmission on the anchor channel. For example, frequency hopping patterns may be employed such that synchronization signal transmissions on the anchor carrier occur between hops to other frequency hopping channels, as described in further detail below. In some cases, the synchronization signals may be transmitted without performing a LBT procedure. Other transmissions (e.g., other non-synchronization signal transmissions) may otherwise occur on non-anchor channels (e.g., other frequency hopping channels) according to the frequency hopping pattern. As such, synchronization and paging channel designs (e.g., frequency hopping patterns) described herein may provide for improved cell acquisition (e.g., in internet of things (IoT) unlicensed spectrum communications systems).

Aspects of the disclosure are initially described in the context of a wireless communications system. Example frequency hopping patterns and process flows implementing discussed channel designs are then described. Aspects of the disclosure are further illustrated by and described with reference to apparatus diagrams, system diagrams, and flowcharts that relate to synchronization and paging channel design for wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, and/or downlink transmissions, from a base station 105 to a UE 115. Control information and data may be multiplexed on an uplink channel or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station 105 without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system 100 may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller. In some examples, base stations 105 may be macro cells, small cells, hot spots, or the like. Base stations 105 may also be referred to as evolved NodeBs (eNBs) or gNodeBs (gNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operates according to a layered protocol stack. In the user plane, communications at the bearer or packet data convergence protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use automated repeat request (ARQ) and/or Hybrid ARQ (HARQ) to provide retransmission at the MAC layer to improve link efficiency. In the control plane, the radio resource control (RRC) protocol layer may provide establishment, configuration, and maintenance of an RRC connection between a UE 115 and a network device, base station 105, or core network 130 supporting radio bearers for user plane data. At the Physical (PHY) layer, transport channels may be mapped to physical channels.

Time intervals in LTE or NR may be expressed in multiples of a basic time unit. Time resources may be organized according to radio frames of length of 10 ms, which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be. In some aspects, wireless communications system 100 may utilize control channel elements (CCEs). A CCE may include a set of 36 resource elements to which part or all of a physical downlink control channel (PDCCH) message can be mapped.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ LBT procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD or a combination of both.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit a PSS but not an SSS, or vice versa. Both the PSS and the SSS may be located in the central subcarriers (e.g., 62 and 72 subcarriers) of a carrier, respectively. In some cases, a UE 115 may acquire the synchronization signals by performing a correlation that includes combining a series of cumulative, coherent sub-correlations, where the sub-correlations may involve a comparison between the signal received during each interval and the predefined repeated sequences in the synchronization signal.

After completing initial cell synchronization, the UE 115 may receive a master information block (MIB) and may decode the MIB. The MIB may contain system bandwidth information, an SFN, and a physical hybrid automatic repeat request (HARQ) indicator channel (PHICH) configuration. The MIB may be transmitted on physical broadcast channel (PBCH) and may utilize the first 4 orthogonal frequency division multiple access (OFDMA) symbols of the second slot of the first subframe of each radio frame. It may use the middle 6 resource blocks (72 subcarriers) in the frequency domain. The MIB carries a few important pieces of information for UE initial access, including: downlink channel bandwidth in term of resource blocks, PHICH configuration (duration and resource assignment), and SFN. A new MIB may be broadcast every fourth radio frame (SFN mod 4=0) and rebroadcast every frame (10 ms). Each repetition is scrambled with a different scrambling code. After reading a MIB (e.g., either a new version or a copy), the UE 115 may try different phases of a scrambling code until it gets a successful cyclic redundancy check (CRC). The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase.

After decoding the MIB, the UE 115 may receive one or more system information block (SIBs). For example, SIB1 may contain cell access parameters and scheduling information for other SIBs. Decoding SIB1 may enable the UE 115 to receive SIB2. SIB2 may contain RRC configuration information related to random access channel (RACH) procedures, paging, physical uplink control channel (PUCCH), physical uplink shared channel (PUSCH), power control, SRS, and cell barring. The UE 115 may thus decode SIB1 and SIB2 prior to accessing the network. Different SIBs may be defined according to the type of system information conveyed. A new SIB1 may be transmitted in the fifth subframe of every eighth frame (SFN mod 8=0) and rebroadcast every other frame (20 ms). SIB1 includes access information, including cell identity information, and it may indicate whether a UE is allowed to camp on a cell of a base station 105. SIB1 also includes cell selection information (or cell selection parameters). Additionally, SIB1 includes scheduling information for other SIBs. SIB2 may be scheduled dynamically according to information in SIB1, and includes access information and parameters related to common and shared channels. The periodicity of SIB2 may be set to 8, 16, 32, 64, 128, 256 or 512 radio frames.

After the UE 115 decodes SIB2, it may transmit a RACH preamble to a base station 105. This may be known as RACH message 1. For example, the RACH preamble may be randomly selected from a set of 64 predetermined sequences. This may enable the base station 105 to distinguish between multiple UEs 115 trying to access the system simultaneously. The base station 105 may respond with a random access response (RAR), or RACH message 2, that may provide an uplink resource grant, a timing advance and a temporary cell radio network temporary identity (C-RNTI). The UE 115 may then transmit an RRC connection request, or RACH message 3, along with a temporary mobile subscriber identity (TMSI) (e.g., if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message, or RACH message 4, addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

Wireless communications system 100 may support improved synchronization and paging channel designs (e.g., frequency hopping patterns) as described herein. That is, base stations 105 of wireless communications system 100 may identify anchor channels within a set of hopping frequencies for paging and transmission of synchronization signals (e.g., DRS transmissions) to UEs 115. UEs 115 may monitor the one or more of the anchor channels to identify synchronization signals and perform cell acquisition procedures. As further described below, the synchronization and paging channel designs discussed herein may result in more frequent synchronization signal transmission over identified anchor channels, and may thus provide for improved cell acquisition by UEs 115.

Figure 2:
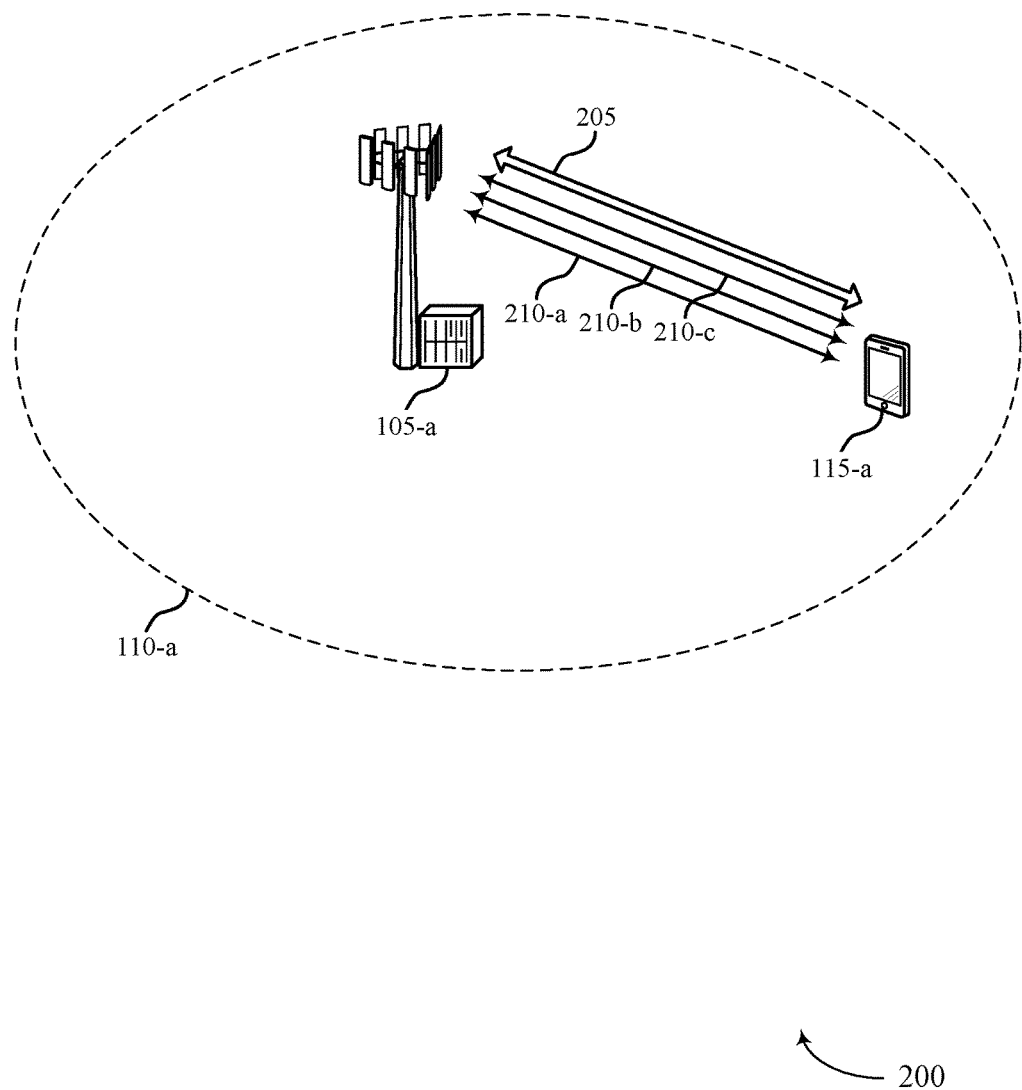
FIG. 2 illustrates an example of a wireless communications system that supports synchronization and paging channel design for wireless communications in accordance with aspects of the present disclosure.

FIG. 2 illustrates an example of a wireless communications system 200 that supports synchronization and paging channel design for wireless communications in accordance with various aspects of the present disclosure. In some examples, wireless communications system 200 may implement aspects of wireless communications system 100. Wireless communications system 200 may include a base station 105-a and a UE 115-a, which may be examples of the corresponding devices described herein. Broadly, wireless communications system 200 illustrates examples of base station 105-a using synchronization and paging frequency hopping channel designs. That is, base station 105-a may utilize anchor channels 205 and non-anchor channels 210 for communications with UE 115-a.

Base station 105-a may identify one or more anchor channels 205 within a set of hopping frequencies (e.g., frequencies associated with anchor channels 205 and non-anchor channels 210) for paging and transmission of synchronization signals (e.g., DRS transmissions) within a wireless communications system 200. UE 115-a may anchor channels 210 to identify or receive synchronization signals. In some cases, anchor channel 210 (e.g., a particular hop frequency) may be monitored for a duration that may span the periodicity of synchronization signal transmissions on the anchor channel 210. For example, wireless communications system 200 may employ frequency hopping patterns such that synchronization signal transmissions on the anchor channel 210 occur between hops to other frequency hopping channels (e.g., between hops to non-anchor channels 210). For example, base station 105-a may transmit DRS on anchor channel, hop to non-anchor channel 210-a (e.g., for other transmissions), hop to non-anchor channel 210-b, hop to non-anchor channel 210-c, and hop back to anchor channel 205 for subsequent DRS transmission. Alternatively, base station 105-a may hop back to anchor channel 205 for DRS transmissions between each hop to non-anchor channels 210, hop back to anchor channel 205 after hopping from non-anchor channel 210-a to non-anchor channel 210-b, etc. Any number of different frequency hopping patterns may be utilized according to techniques described.

In some cases, the synchronization signals may be transmitted without performing a LBT procedure. That is, transmissions on anchor channels 205 may be transmitted without performing LBT procedures. Other transmissions (e.g., other non-synchronization signal transmissions) may otherwise occur on non-anchor channels 210 (e.g., other frequency hopping channels) according to the frequency hopping pattern. However, such transmissions on non-anchor channels 210 may, in some cases, still be associated with LBT procedures.

In some examples, wireless communications system 200 may support frequency hopping in a 2400-2483.5 MHz band using at least 15 channels (e.g., 15 non-anchor channels 210). In such cases, an average time of occupancy on any channel may be less than or equal to 0.4 seconds, within a period of 0.4 seconds multiplied by the number of hopping channels employed. Such frequency hopping systems may avoid or reduce transmissions on a particular hopping frequency, provided that at least 15 channels are used. An accumulated transfer time (ATT) may refer to a total number of transmitter 'on' times, during a given observation period on a particular hopping frequency. Frequency occupation may refer to a number of times each hopping frequency (e.g., associated with anchor channels 205 and non-anchor channels 210) is occupied within a given period. A hopping frequency may be considered to be occupied when the equipment selects or hops to that frequency from the hopping sequence. The equipment may be transmitting, receiving, or stay idle during the dwell time spent on that hopping frequency. A hopping sequence of a frequency hopping equipment may refer to an unrepeated pattern of the hopping frequencies used by the equipment.

In some cases (e.g., during active frequency hopping), the ATT on any hopping frequency may be less than, for example, 400 ms within any observation period of 400 ms multiplied by the minimum number of hopping frequencies (e.g., 'N') that are to be used. In other cases (e.g., during non-active frequency hopping), ATT on any hopping frequency may be less than, for example, 15 ms within any observation period of 15 ms multiplied by the minimum number of hopping frequencies (e.g., 'N') that are to be used. To comply with frequency occupation criteria, for example, each hopping frequency of the hopping sequence may be occupied at least once within a period not exceeding four times the product of the dwell time and the number of hopping frequencies in use. Alternatively, to comply with frequency occupation criteria, for example, the occupation probability for each frequency may be between 1/U*25% and 77% where U is the number of hopping frequencies in use. The one or more hopping sequences may include at least 'N' hopping frequencies at all times, where 'N' is either 15 or the result of 15 MHz divided by minimum hopping frequency separation in MHz, whichever is larger.

In some examples, wireless communications system 200 may support digital transmission system (DTS) and frequency hopping spread spectrum (FHSS) modes of operation. Further, wireless communications system 200 may employ mutually exclusive DTS and FHSS operation modes. A first operation mode may be as a FHSS system and the second operation mode may be as a DTS. For example, base station 105-a and/or UE 115-a may be operated as a FHSS system (e.g., in a FHSS operation mode) while transmitting data and as a DTS (e.g., in a DTS operation mode) while in acquisition mode. Base station 105-a and/or UE 115-a may thus comply with rules for FHSS systems when operating in a FHSS operation mode in addition to complying with DTS regulations when operating in a DTS operation mode. As discussed above, each operation mode may be mutually exclusive, such that each mode of operation may be distinguished and separately demonstrated to comply with pertinent standards.

In other examples, wireless communications system 200 may support a hybrid system consisting of a transmission system that employs a combination of both direct sequence and frequency hopping techniques. Such systems may comply with, for example, a 17 dB processing gain. In examples described above, the processing gain requirement may be replaced by the DTS regulations. A hybrid system may utilize both digital modulation and frequency hopping techniques at the same time on the same carrier (e.g., channel). Such systems may be similar to the combination DTS/FHSS operating systems described above, but the system may be subject to different standards or limitations. Hybrid systems may be designed to comply with the power density standard of, for example, 8 dBm in any 3 kHz band when the frequency hopping function is turned off. Transmissions in such systems may comply with, for example, a 0.4 second/channel maximum dwell time when the hopping function is turned on. In some examples, such hybrid systems may or may not comply with a given bandwidth associated with a DTS transmission (e.g., 500 kHz minimum bandwidth) and, there may be any minimum number of hopping channels associated with this type of hybrid system. However, the hopping function may be a true hopping system, according to a minimum channel separation, a pseudo-random hop sequence, equal use of each frequency, receiver matching bandwidth and synchronization, etc. Additional criteria for hybrid transmitting devices may include output limits (e.g., 1 watt) and radio frequency (RF) safety requirements.

In some cases, anchor channels 205 may be selected or identified such that their associated bandwidth is located within a guardband (e.g., WiFi guardband frequencies) to improve detectability and reduce interference. In some cases, mobile devices (e.g., UEs 115 and/or base stations 105) may comply with anchor channels 205 operating according to a DTS operation mode, and the remaining channels (e.g., non-anchor channels 210) may operate as according to a FHSS operation mode. Additionally or alternatively, mobile devices (e.g., UEs 115 and/or base stations 105) may revisit anchor channels 205 with a specified probability, but with a TDD configuration that results in reduced channel occupancy time per channel visit. Further, wireless communications system 200 may support anchor channel based RRM/mobility (e.g., in addition to system information, UEs 115 may use the anchor channel 205 for neighbor cell measurements).

UEs 115-a may monitor paging on anchor channels 205. As such, UE 115-a may not need to identify frequencies or non-anchor channels base station 105-a is currently transmitting on (e.g., UE 115-a may monitor anchor channel 205 until base station 105-a hops back to the anchor channel 205 for DRS transmission). Further, base station 105-a may perform paging on the anchor channel 205. Other base stations 105 may, in some cases, transmit some overlapping paging information on the anchor channel 205, but at different times. UE 115-a may be configured to monitor the paging transmissions from multiple base stations 105 on the anchor channel such that the paging overhead per base station 105 reduces if transmissions are TDM on the anchor carrier.

Figure 3:
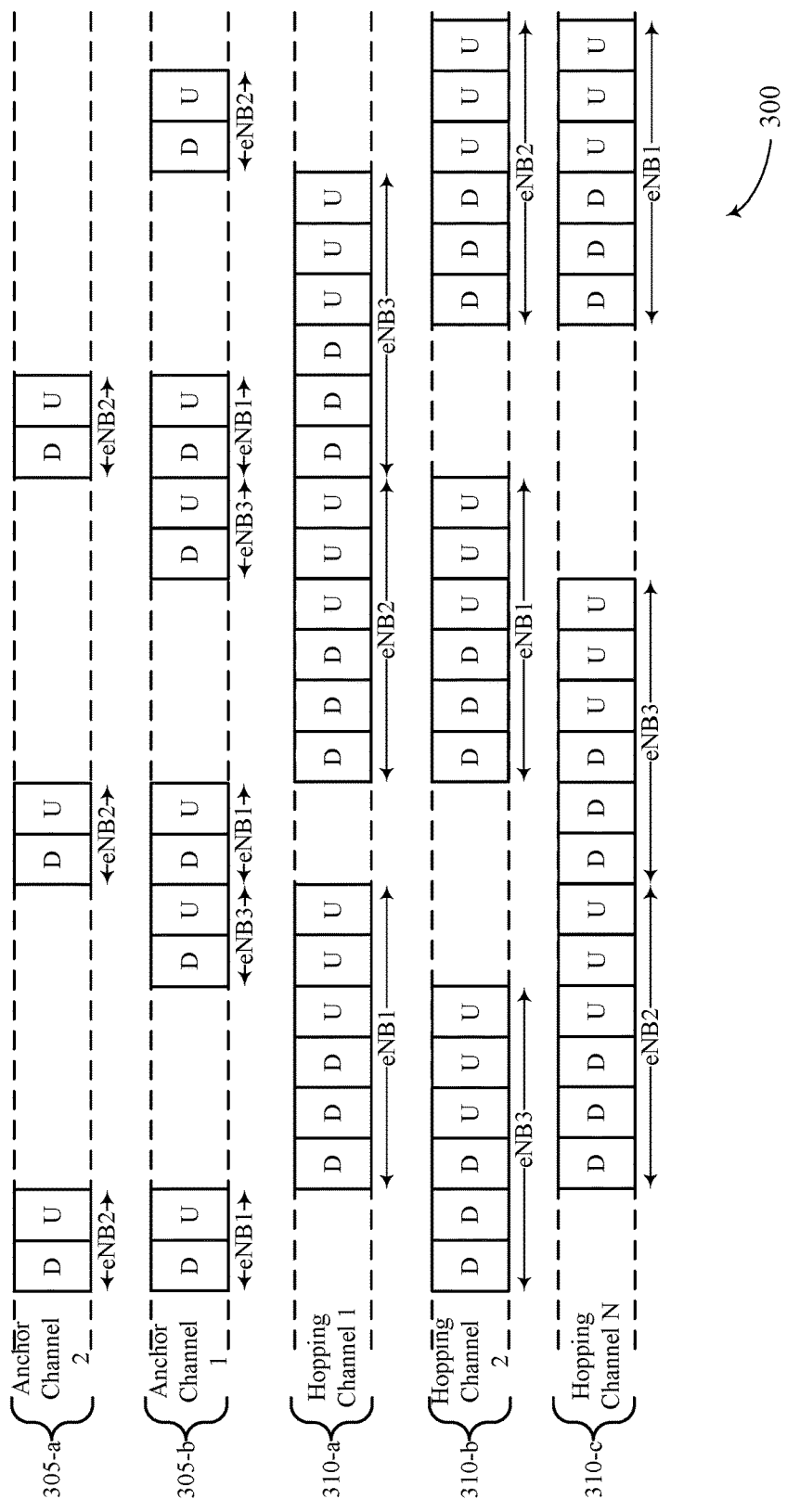
FIGS. 3 through 5 illustrate examples of frequency hopping patterns that support synchronization and paging channel design for wireless communications in accordance with aspects of the present disclosure.

FIG. 3 illustrates an example of a frequency hopping pattern 300 that supports synchronization and paging channel design for wireless communications in accordance with various aspects of the present disclosure. In some examples, frequency hopping pattern 300 may implement aspects of wireless communications system 100 and wireless communications system 200. That is, frequency hopping pattern 300 may be implemented by base stations 105 for improved cell acquisition by UEs 115. Broadly, frequency hopping pattern 300 illustrates an example of improved synchronization and paging channel designs described herein. Specifically, frequency hopping pattern 300 illustrates patterns by which base stations 105 (e.g., "eNB1," "eNB2," and "eNB3") hop between anchor channels 305 (e.g., "Anchor Channel 1" and "Anchor Channel 2") and non-anchor channels 310 (e.g., "Hopping Channel 1," "Hopping Channel 2," etc. through "Hopping Channel N"). Further, "U" and "D" may be used to illustrate downlink and uplink subframes, and are for illustrative purposes only. It should be noted that alternate subframe configurations, and frequency hopping patterns may be implemented by analogy, without departing from the scope of the present disclosure.

According to frequency hopping pattern 300, anchor channels 305 may be visited (e.g., hopped to) often by base stations 105 to transmit DRS (e.g., PSS, SSS, PBCH, SIB, etc.). Anchor channels 305 may be visited after, for example, one or two frequency hops to transmit DRS. In some cases, RACH resources may be provided on the anchor channel. DRS, including MIB and SIB, may be used to indicate parameters of frequency hopping pattern 300 such as hop frequencies (e.g., actual frequencies associated with hopping channels including anchor channels 305 and non-anchor channels 310), durations of each hop (e.g., channel occupancy durations), placement of anchor channels 305 relative to the hopping schedule, spacing in the frequency domain between hopping channels, etc. Different base stations 105 may be time division multiplexed within anchor channels 305 (e.g., eNB 1 and eNB 3 may be TDM within anchor channel 305-b). Other locations of hops to anchor channels 305 may also be possible. For example, some downlink/uplink (e.g., D/U) subframes, followed by anchor carrier subframes, then back to regular hoping channel, in the switch between D and U subframes, etc. Selection of anchor channel transmission locations may also be a function of whether the base stations 105 and UEs 115 perform LBT procedures. For example, if base stations 105 performs a LBT procedure, the downlink subframes may not be split apart or broken up.

The bandwidth associated with anchor channels 305 may be different than bandwidth associated with non-anchor channels 310. For example, 1.4 MHz may be used for anchor channels (e.g., DRS transmissions), and 5 MHz may be used for other hopping channels (e.g., non-anchor channels 310). Further, anchor channels 305 may be associated with power boosting (e.g., transmissions over anchor channels 305 may be transmitted with more power than transmissions over non-anchor channels 310) to improve acquisition time if the bandwidth associated with other hopping channels (e.g., non-anchor channels 310) is larger. Multiple anchor channels may be accommodated within the bandwidth of one regular hop channel. For example, anchor channel 305-a and anchor channel 305-b may reside within a hopping channel bandwidth, where other non-anchor channels 310 are each individually associated with the same hopping channel bandwidth (e.g., albeit at different locations of the frequency spectrum). Further, different base stations 105 within a wireless communications system may use different anchor channels 305 for DRS transmissions (e.g., eNB2 may use anchor channel 305-a, and eNB1 and eNB3 may use anchor channel 305-b). In such cases, UEs 115 may monitor both anchor channel 305-a and anchor channel 305-b for cell acquisition procedures.

In some cases, base stations 105 may perform LBT procedures for transmissions associated with non-anchor channels 310, but may not perform LBT procedures for transmissions (e.g., DRS transmissions) on anchor channels 305 (e.g., as anchor channels 305 and non-anchor channels 310 may comply with different modes of operation, as discussed above with reference to FIG. 2). For example, anchor channels 305 may operate in DTS mode, and non-anchor channels may operate in FHSS mode. In some examples, transmissions over anchor channels 305 may also indicate whether the base station 105 performs LBT procedures or not in the regular subframes. The base stations (e.g., eNB 1, eNB 2, and eNB3) may coordinate transmissions on the anchor channel 305 to avoid collisions.

Figure 4:
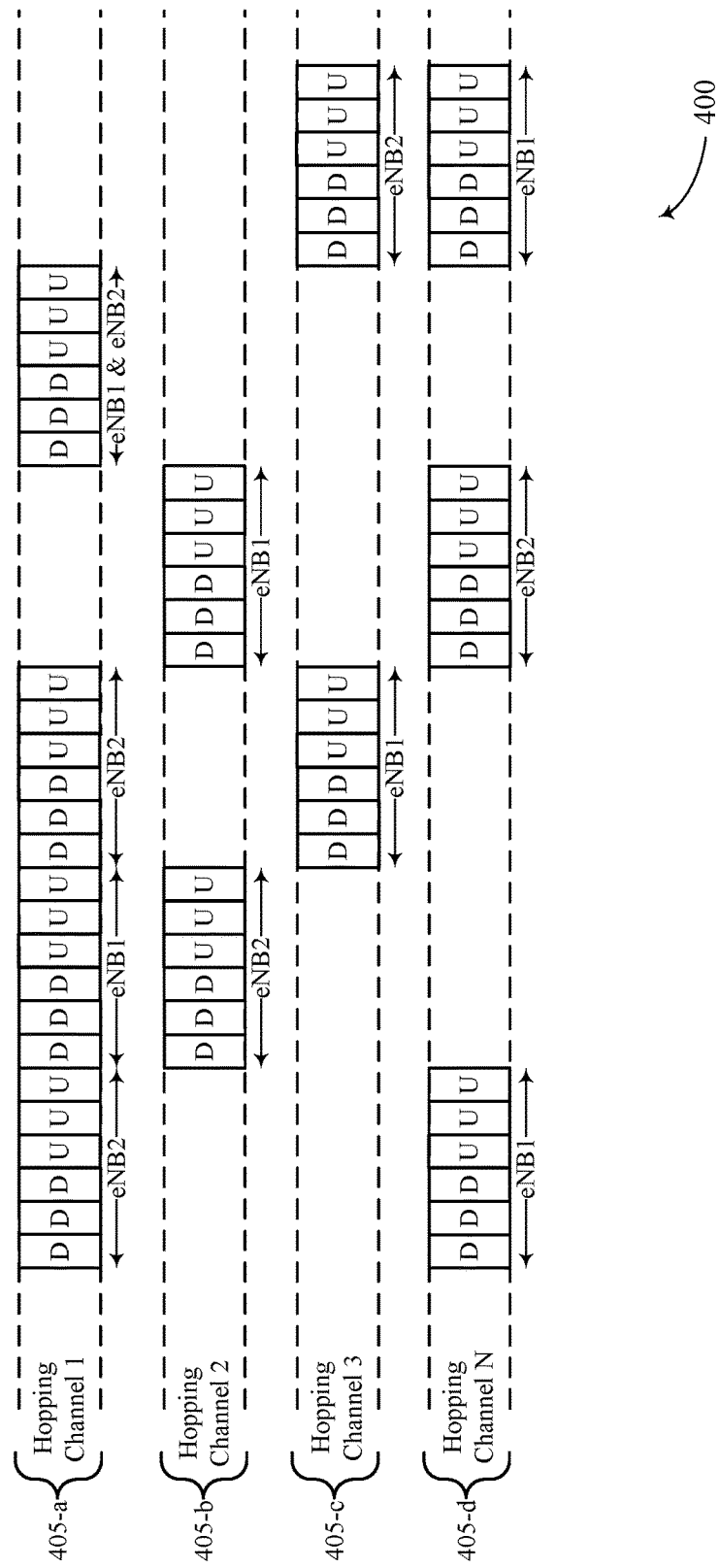

FIG. 4 illustrates an example of a frequency hopping pattern 400 that supports synchronization and paging channel design for wireless communications in accordance with various aspects of the present disclosure. In some examples, frequency hopping pattern 400 may implement aspects of wireless communications system 100 and wireless communications system 200. That is, frequency hopping pattern 400 may be implemented by base stations 105 for improved cell acquisition by UEs 115. Broadly, frequency hopping pattern 400 illustrates an example of improved synchronization and paging channel designs described herein. Specifically, frequency hopping pattern 400 illustrates patterns by which base stations 105 (e.g., "eNB1" and "eNB2") hop between hopping channels 405 (e.g., "Hopping Channel 1," "Hopping Channel 2," etc. through "Hopping Channel N"). Further, "U" and "D" may be used to illustrate downlink and uplink subframes, and are for illustrative purposes only. It should be noted that alternate subframe configurations, and frequency hopping patterns may be implemented by analogy, without departing from the scope of the present disclosure. Frequency hopping pattern 400 illustrates a generic set of hopping frequencies (e.g., for hopping channels 405), in some examples, hopping channel 405-a may be referred to as an anchor channel.

According to frequency hopping pattern 400, an anchor channel may be one of the hop frequencies (e.g., a hopping channel 405-a) as long as the dwell time criteria is satisfied (e.g., channel occupancy does not exceed a predetermined threshold). Each base station 105, or in some cases a group of base stations 105, may select a probability of occupying an "anchor channel" or hopping channel 405. For example, eNB 1 may select or hop to hopping channel 405-a (e.g., the "anchor channel") once in every three hops as illustrated, while eNB 2 may hop to the hopping channel 405-a once in every two hops. In some cases, base stations 105 may hop pseudo randomly for the rest of the hopping channels 405 and visit the anchor channel (e.g., hopping channel 405-a) once according to every selected period. System information may indicate the time to revisit the anchor channel as well as the parameters to derive the hopping sequence. In some cases, cell acquisition may be a one shot unless revisit times are specified. Each hopping channel 405 may be visited at least once. Some hopping channels 405 may be visited with a higher probability (e.g., hopping channel 405-a may be visited 50% of the time for eNB1 and 33% of the time for eNB1).

Figure 5:
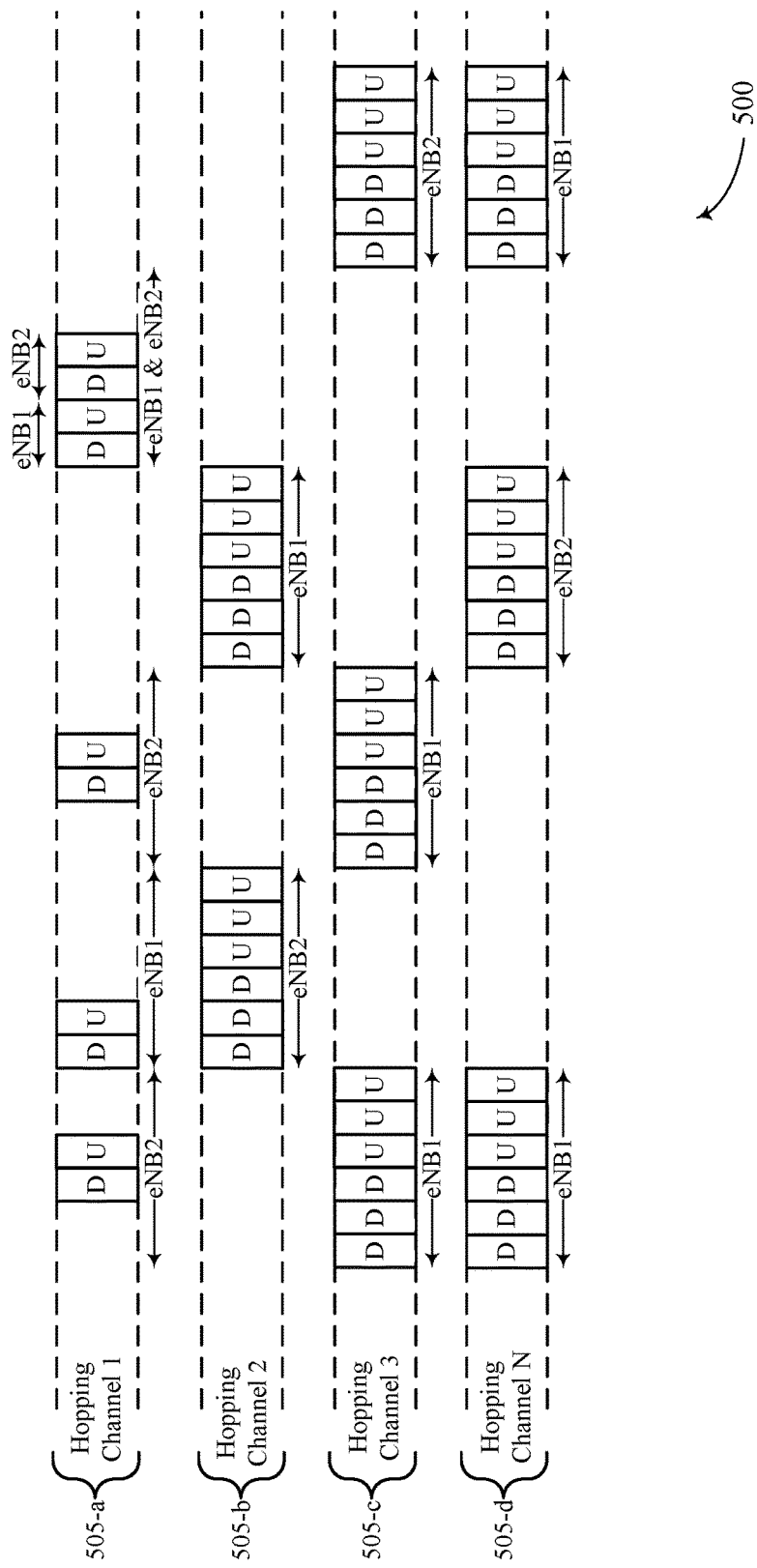

FIG. 5 illustrates an example of a frequency hopping pattern 500 that supports synchronization and paging channel design for wireless communications in accordance with various aspects of the present disclosure. In some examples, frequency hopping pattern 500 may implement aspects of wireless communications system 100. In some examples, frequency hopping pattern 500 may implement aspects of wireless communications system 100 and wireless communications system 200. That is, frequency hopping pattern 500 may be implemented by base stations 105 for improved cell acquisition by UEs 115. Broadly, frequency hopping pattern 500 illustrates an example of improved synchronization and paging channel designs described herein. Specifically, frequency hopping pattern 500 illustrates patterns by which base stations 105 (e.g., "eNB1" and "eNB2") hop between hopping channels 505 (e.g., "Hopping Channel 1," "Hopping Channel 2," etc. through "Hopping Channel N"). Further, "U" and "D" may be used to illustrate downlink and uplink subframes, and are for illustrative purposes only. It should be noted that alternate subframe configurations, and frequency hopping patterns may be implemented by analogy, without departing from the scope of the present disclosure. Frequency hopping pattern 500 illustrates a generic set of hopping frequencies (e.g., for hopping channels 505), in some examples, hopping channel 505-a may be referred to as an anchor channel.

According to frequency hopping pattern 500, an anchor channel (e.g., hopping channel 505-a) may be associated with a different TDD structure than other hopping channels (e.g., hopping channel 505-b, hopping channel 505-c, etc. through hopping channel 505-a). Such different TDD frame structures may maintain average channel occupancy requirements due to a larger number of visits or hops to the anchor channel. Base stations 105 may not coordinate with each other for anchor channel visits in such scenarios. Multiple base stations 105 may happen to transmit on the same frequency (e.g., hopping channel 505) at the same time. Further, base stations 105 may perform paging on the anchor carrier such that, in some cases, eNB1 and eNB2 may transmit some overlapping paging information on the anchor channel (e.g., hopping channel 505-a), but at different times. UEs 115 may be configured to monitor the paging transmissions from multiple base stations 105 on the anchor channel such that the paging overhead per base station 105 reduces if transmissions are TDM on the anchor carrier.

Figure 6:
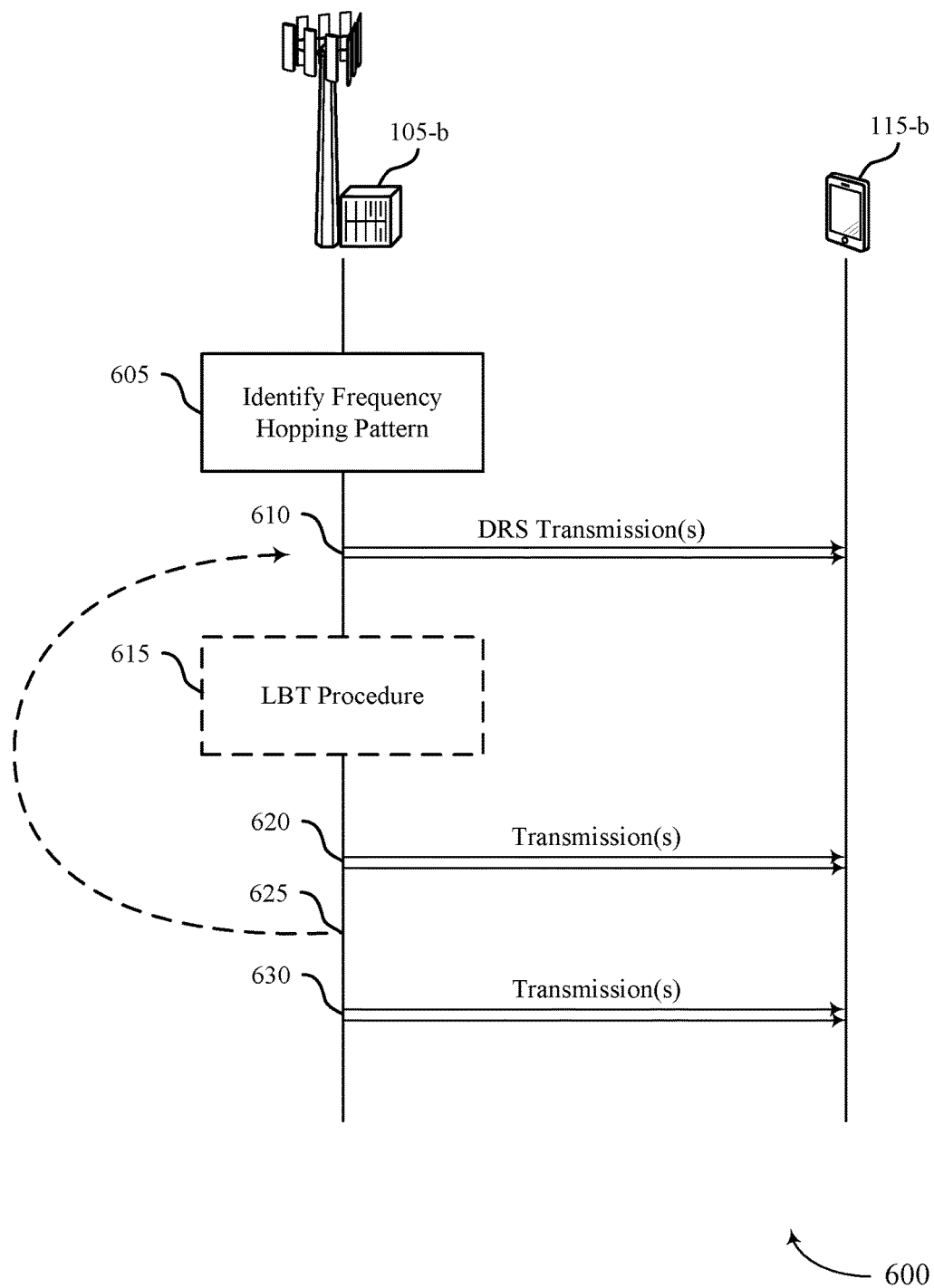
FIG. 6 illustrates an example of a process flow that supports synchronization and paging channel design for wireless communications in accordance with aspects of the present disclosure.

FIG. 6 illustrates an example of a process flow 600 that supports synchronization and paging channel design for wireless communications in accordance with various aspects of the present disclosure. In some examples, process flow 600 may implement aspects of wireless communications system 100. Process flow 600 includes base station 105-b and UE 115-b, which may be examples of the corresponding devices described herein.

At 605, base station 105-b may identify a frequency hopping pattern that includes multiple hopping frequencies. The hopping frequencies may include an anchor channel frequency and a set of non-anchor channel frequencies. In some cases, base station 105-a may determine a probability for occupying the anchor channel frequency within the hopping interval. The probability for occupying the anchor channel frequency may be greater than a probability for occupying a non-anchor channel frequency. A channel frequency occupation duration may be based on whether a LBT procedure is performed on the channel prior to performing the transmissions. Further, the transmission duration associated with the anchor channel may be less than transmission durations associated with non-anchor channel frequency channels. In some cases, identifying the frequency hopping pattern may include coordination of transmissions with other wireless devices, such that collisions may be avoided on the anchor channel frequency channel.

At 610, base station 105-b may transmit one or more DRS transmissions over the anchor channel frequency. In some cases, a UE 115-b may receive the one or more DRS transmissions for cell acquisition at 610. In some cases, the one or more DRS transmission may not be associated with LBT procedures (e.g., the frequency location of the may be further based on whether a LBT procedure is performed on the channel prior to performing transmissions). In some cases, base station 105-b may perform a random access procedure with UE 115-b using the anchor channel frequency. The DRS transmissions may include a PSS, SSS, PBCH, MIB, SIB, etc. In some cases, the anchor channel may be used to indicate at least one non-anchor channel frequency, a hop duration for the at least one non-anchor channel frequency, and a location of the anchor channel frequency with respect to the at least one non-anchor channel frequency. In some cases, a transmission power associated with the anchor channel frequency is greater than a transmission power associated with the set of non-anchor channel frequencies. In some cases, a power spectral density (PSD) associated with the anchor channel frequency is greater than a PSD associated with the set of non-anchor channel frequencies. In some examples, the transmissions performed via the anchor channel frequency comprise an indication of RACH resources. Additionally, base station 105-b may transmit a paging message and/or position information on or over the anchor channel frequency, and receive a paging response from a wireless device over the anchor channel frequency, the paging response based at least in part on the paging message. In some cases, UE 115-b may perform a measurement of a neighboring cell using the anchor channel frequency and adjust a RRM parameter based on the measurement.

At 615, base station 105-b may hop or visit a non-anchor channel, and in some cases, may optionally perform a LBT procedure on the non-anchor channel frequency. That is, base station 105-b may perform an LBT prior to performing transmissions over the non-anchor channel frequency.

At 620, base station 105-b may transmit transmissions over the non-anchor channel. In some cases, the DRS transmissions of 610 may be transmitted according to a different TDD configuration than the transmissions of 620.

At 625, base station 105-b may hop or visit another frequency hopping channel. In some cases, base station 105-b may hop back to the anchor channel (e.g., repeat 610). In such cases, base station 105-b may perform another DRS transmission on the anchor carrier. In other cases, base station 105-b may hop or visit a second non-anchor channel and proceed to 630.

At 630, base station 105-b may transmit transmissions over the second non-anchor channel.

Figure 7:
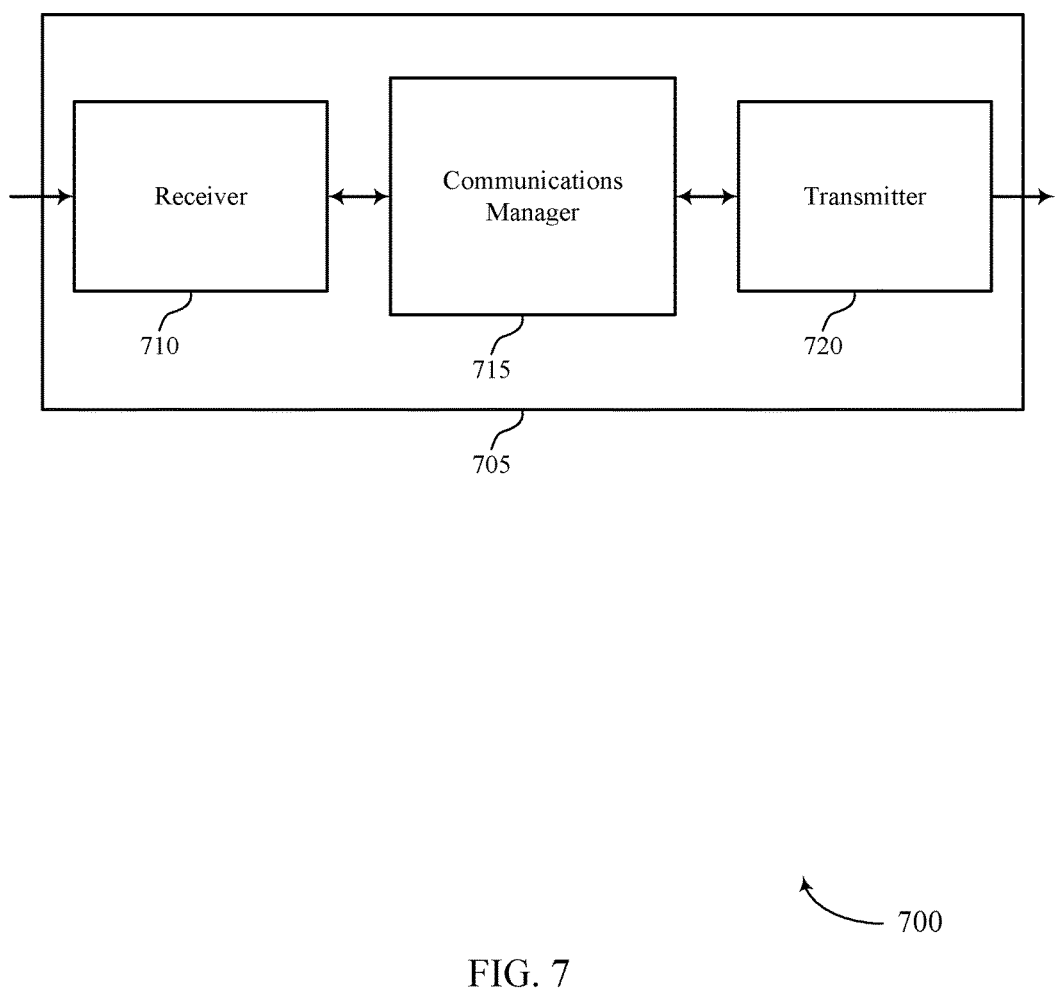
FIGS. 7 through 9 show block diagrams of a device that supports synchronization and paging channel design for wireless communications in accordance with aspects of the present disclosure.

FIG. 7 shows a block diagram 700 of a wireless device 705 that supports synchronization and paging channel design for wireless communications in accordance with aspects of the present disclosure. Wireless device 705 may be an example of aspects of a base station 105 or a UE 115 as described herein. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to synchronization and paging channel design for wireless communications, etc.). Information may be passed on to other components of the device. The receiver 710 may be an example of aspects of the transceiver 1035 described with reference to FIG. 10. The receiver 710 may utilize a single antenna or a set of antennas.

Communications manager 715 may be an example of aspects of the communications manager 1015 described with reference to FIG. 10.

Communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 715 may identify a frequency hopping pattern including a set of hopping frequencies, the set of hopping frequencies including an anchor channel frequency and a set of non-anchor channel frequencies and perform a set of transmissions over the set of hopping frequencies during a hopping interval based on the frequency hopping pattern, where the set of transmissions include a first number of discovery reference signal (DRS) transmissions on the anchor channel frequency and a second number of transmissions on each non-anchor channel frequency, the first number being greater than or equal to the second number.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
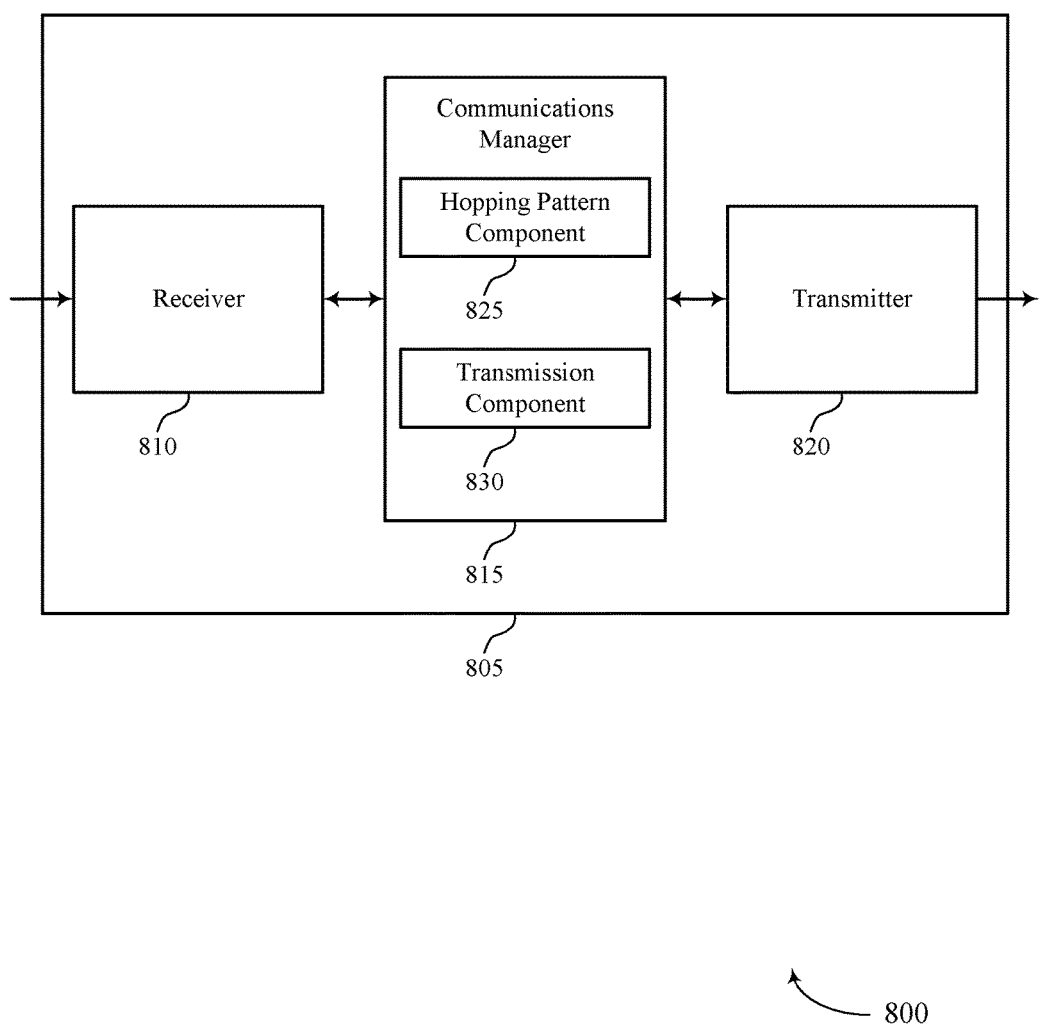

FIG. 8 shows a block diagram 800 of a wireless device 805 that supports synchronization and paging channel design for wireless communications in accordance with aspects of the present disclosure. Wireless device 805 may be an example of aspects of a wireless device 705 or a base station 105 or a UE 115 as described with reference to FIG. 7. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to synchronization and paging channel design for wireless communications, etc.). Information may be passed on to other components of the device. The receiver 810 may be an example of aspects of the transceiver 1035 described with reference to FIG. 10. The receiver 810 may utilize a single antenna or a set of antennas.

Communications manager 815 may be an example of aspects of the communications manager 1015 described with reference to FIG. 10. Communications manager 815 may also include hopping pattern component 825 and transmission component 830.

Hopping pattern component 825 may identify a frequency hopping pattern including a set of hopping frequencies, the set of hopping frequencies including an anchor channel frequency and a set of non-anchor channel frequencies. In some cases, identifying the frequency hopping pattern further includes: coordinating the set of transmissions with other wireless devices, where the coordination is based on avoiding collisions on the anchor channel frequency. In some cases, a bandwidth associated with the anchor channel frequency is less than a bandwidth associated with the set of non-anchor channel frequencies. In some cases, the bandwidth associated with the anchor channel frequency includes a guardband. In some cases, the anchor channel frequency is within a radio frequency spectrum band different from the set of non-anchor channel frequencies.

Transmission component 830 may perform a set of transmissions over the set of hopping frequencies during a hopping interval based on the frequency hopping pattern, where the set of transmissions include a first number of DRS transmissions on the anchor channel frequency and a second number of transmissions on each non-anchor channel frequency, the first number being greater than or equal to the second number and perform the second number of transmissions on each non-anchor channel frequency according to a second TDD configuration. In some cases, a PSD associated with the anchor channel frequency is greater than a PSD associated with the set of non-anchor channel frequencies. In some cases, performing the set of transmissions includes: performing the first number of DRS transmissions on the anchor channel frequency according to a first TDD configuration. In some cases, each of the first number of DRS transmissions includes at least one of: a PSS, an SSS, a PBCH, a MIB, or a system information block (SIB).

In some cases, performing the set of transmissions includes: performing a DRS transmission on the anchor channel frequency after performing one or more of the second number of transmissions over one or more non-anchor channel frequencies. In some cases, performing the set of transmissions includes: transmitting, to a wireless device, position information during an uplink time interval on the anchor channel frequency. In some cases, a transmission duration associated with the anchor channel frequency is less than a transmission duration associated with the set of non-anchor channel frequencies. In some cases, the transmissions performed via the anchor channel frequency include an indication of random access channel (RACH) resources. In some cases, a transmission power associated with the anchor channel frequency is greater than a transmission power associated with the set of non-anchor channel frequencies. In some cases, performing the set of transmissions includes: transmitting a paging message on the anchor channel frequency.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
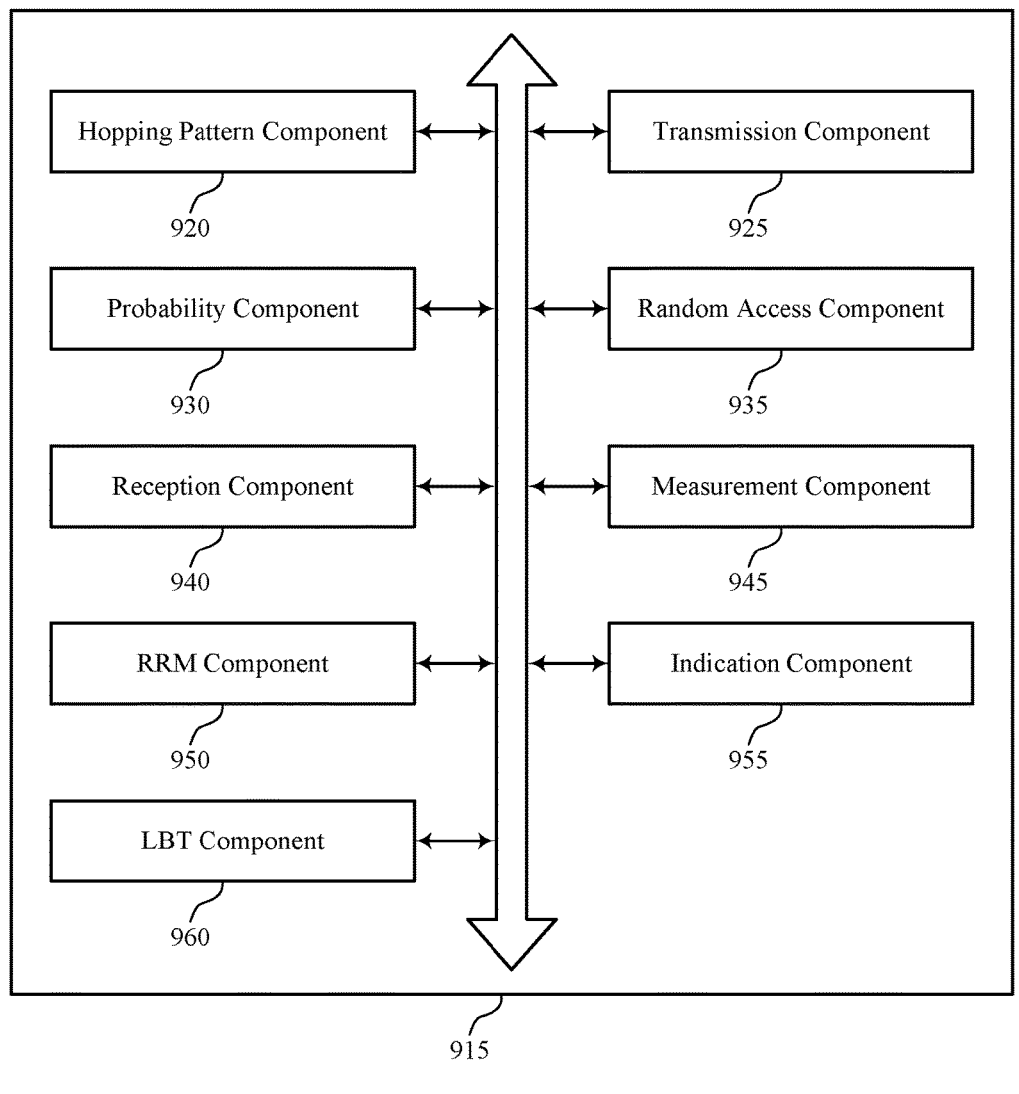

FIG. 9 shows a block diagram 900 of a communications manager 915 that supports synchronization and paging channel design for wireless communications in accordance with aspects of the present disclosure. The communications manager 915 may be an example of aspects of a communications manager 715, a communications manager 815, or a communications manager 1015 described with reference to FIGS. 7, 8, and 10. The communications manager 915 may include hopping pattern component 920, transmission component 925, probability component 930, random access component 935, reception component 940, measurement component 945, RRM component 950, indication component 955, and LBT component 960. Each of these modules may communicate, directly or indirectly, with one another (e.g., via one or more buses).

Hopping pattern component 920 may identify a frequency hopping pattern including a set of hopping frequencies, the set of hopping frequencies including an anchor channel frequency and a set of non-anchor channel frequencies. In some cases, identifying the frequency hopping pattern further includes: coordinating the set of transmissions with other wireless devices, where the coordination is based on avoiding collisions on the anchor channel frequency. In some cases, a bandwidth associated with the anchor channel frequency is less than a bandwidth associated with the set of non-anchor channel frequencies. In some cases, the bandwidth associated with the anchor channel frequency includes a guardband. In some cases, the anchor channel frequency is within a radio frequency spectrum band different from the set of non-anchor channel frequencies.

Transmission component 925 may perform a set of transmissions over the set of hopping frequencies during a hopping interval based on the frequency hopping pattern, where the set of transmissions include a first number of DRS transmissions on the anchor channel frequency and a second number of transmissions on each non-anchor channel frequency, the first number being greater than or equal to the second number and perform the second number of transmissions on each non-anchor channel frequency according to a second TDD configuration. In some cases, a PSD associated with the anchor channel frequency is greater than a PSD associated with the set of non-anchor channel frequencies.

In some cases, performing the set of transmissions includes: performing the first number of DRS transmissions on the anchor channel frequency according to a first TDD configuration. In some cases, each of the first number of DRS transmissions includes at least one of: a PSS, a SSS, a PBCH, a MIB, or a SIB. In some cases, performing the set of transmissions includes: performing a DRS transmission on the anchor channel frequency after performing one or more of the second number of transmissions on one or more non-anchor channel frequencies. In some cases, performing the set of transmissions includes: transmitting, to a wireless device, position information during an uplink time interval on the anchor channel frequency. In some cases, a transmission duration associated with the anchor channel frequency is less than a transmission duration associated with the set of non-anchor channel frequencies. In some cases, the transmissions performed via the anchor channel frequency include an indication of RACH resources. In some cases, a transmission power associated with the anchor channel frequency is greater than a transmission power associated with the set of non-anchor channel frequencies. In some cases, performing the set of transmissions includes: transmitting a paging message on the anchor channel frequency.

Probability component 930 may determine a probability for occupying the anchor channel frequency within the hopping interval, where the probability for occupying the anchor channel frequency is greater than a probability for occupying a non-anchor channel frequency of the set of non-anchor channel frequencies.

Random access component 935 may perform a random access procedure with a wireless device using the anchor channel frequency.

Reception component 940 may receive a paging response from a wireless device on the anchor channel frequency, the paging response based on the paging message and receive, from a wireless device, position information during a downlink time interval on the anchor channel frequency.

Measurement component 945 may perform a measurement of a neighboring cell using the anchor channel frequency.

RRM component 950 may adjust a radio resource management (RRM) parameter based on the measurement of the neighboring cell.

Indication component 955 may indicate, using transmissions via the anchor channel frequency, at least one non-anchor channel frequency of the set of non-anchor channel frequencies, a hop duration for the at least one non-anchor channel frequency of the set of non-anchor channel frequencies, and a location of the anchor channel frequency with respect to the at least one non-anchor channel frequency of the set of non-anchor channel frequencies. In some cases, the location of the anchor channel frequency is based on whether a LBT procedure is performed on a channel prior to the performing transmissions. In some cases, a channel frequency occupation duration is based on whether a LBT procedure is performed on a channel prior to the performing transmissions.

LBT component 960 may perform an LBT procedure prior to performing transmissions over a non-anchor channel frequency of the set of non-anchor channel frequencies and refrain from performing an LBT procedure prior to performing transmissions on the anchor channel frequency.

Figure 10:
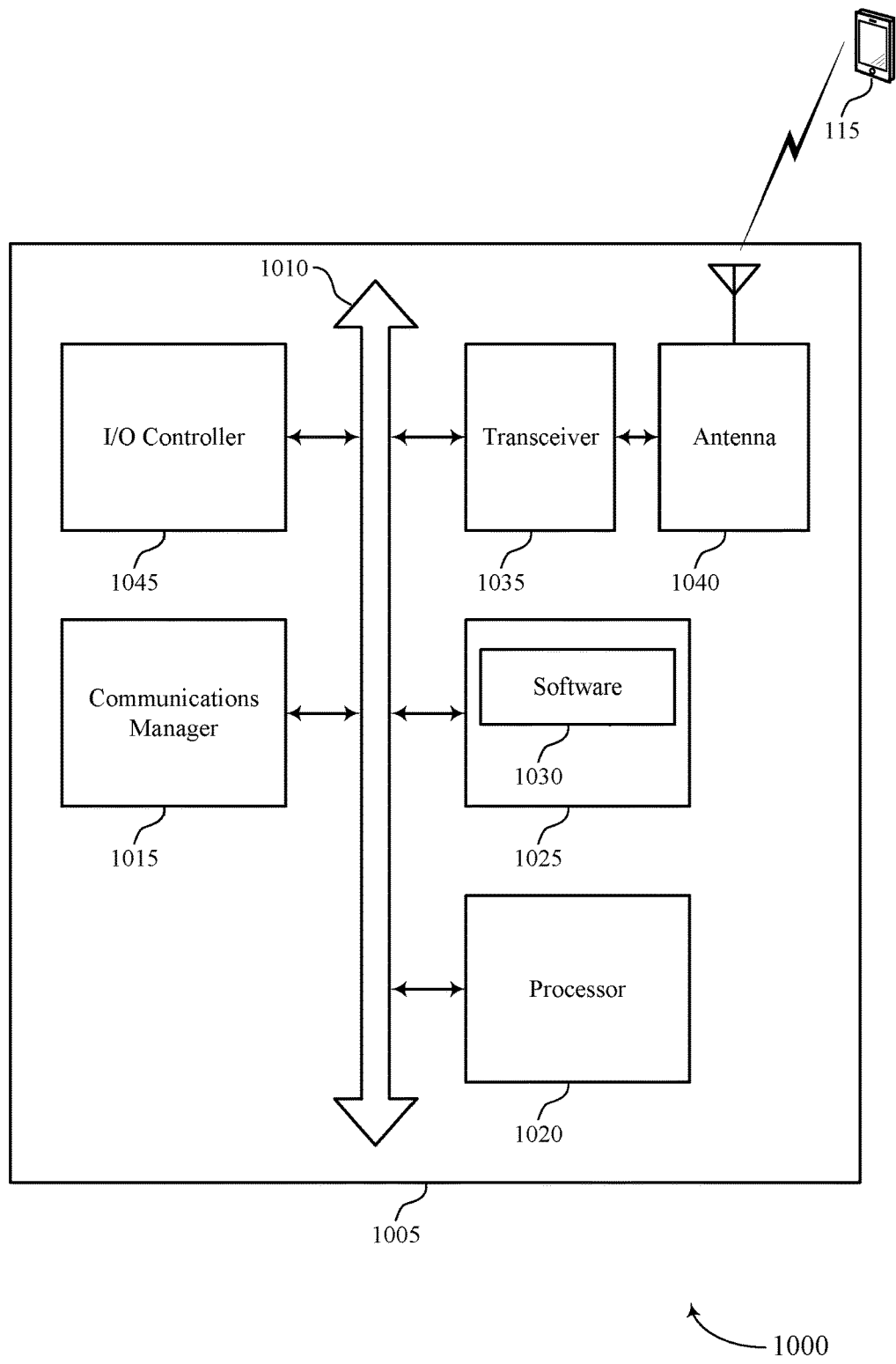
FIG. 10 illustrates a block diagram of a system including a wireless device that supports synchronization and paging channel design for wireless communications in accordance with aspects of the present disclosure.

FIG. 10 shows a diagram of a system 1000 including a device 1005 that supports synchronization and paging channel design for wireless communications in accordance with aspects of the present disclosure. Device 1005 may be an example of or include the components of wireless device 705, wireless device 805, or a base station 105 or a UE 115 as described above, e.g., with reference to FIGS. 7 and 8. Device 1005 may include components for bi-directional voice and data communications including components for transmitting and receiving communications, including communications manager 1015, processor 1020, memory 1025, software 1030, transceiver 1035, antenna 1040, and I/O controller 1045. These components may be in electronic communication via one or more buses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting synchronization and paging channel design for wireless communications).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support synchronization and paging channel design for wireless communications. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
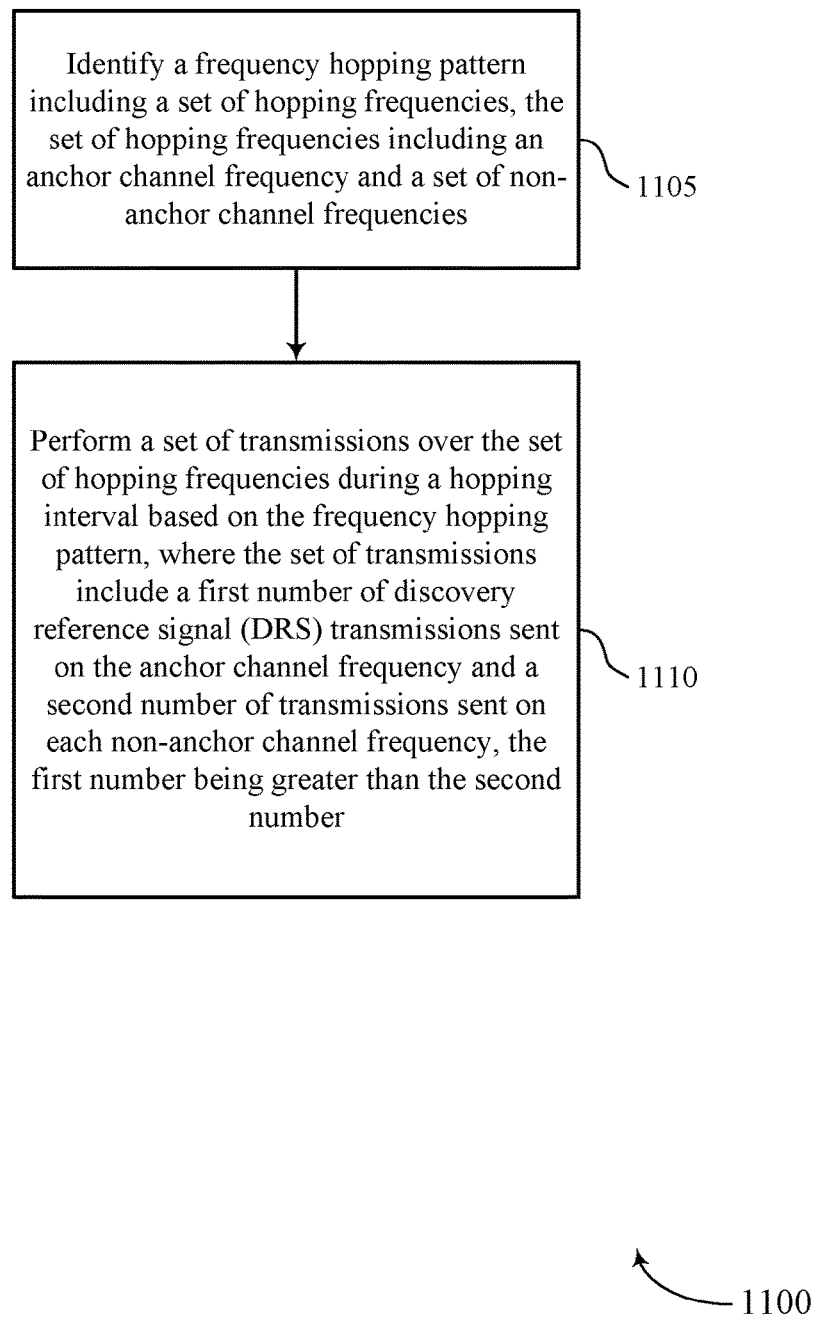
FIGS. 11 through 12 illustrate methods for synchronization and paging channel design for wireless communications in accordance with aspects of the present disclosure.

FIG. 11 shows a flowchart illustrating a method 1100 for synchronization and paging channel design for wireless communications in accordance with aspects of the present disclosure. The operations of method 1100 may be implemented by a base station 105 or a UE 115 or its components as described herein. For example, the operations of method 1100 may be performed by a communications manager as described with reference to FIGS. 7 through 10. In some examples, a base station 105 or a UE 115 may execute a set of codes to control the functional elements of the device to perform the functions described below. Additionally or alternatively, the base station 105 or a UE 115 may perform aspects of the functions described below using special-purpose hardware.

At block 1105 the base station 105 or a UE 115 may identify a frequency hopping pattern comprising a plurality of hopping frequencies, the plurality of hopping frequencies comprising an anchor channel frequency and a set of non-anchor channel frequencies. The operations of block 1105 may be performed according to the methods described herein. In certain examples, aspects of the operations of block 1105 may be performed by a hopping pattern component as described with reference to FIGS. 7 through 10.

At block 1110 the base station 105 or a UE 115 may perform a plurality of transmissions over the plurality of hopping frequencies during a hopping interval based at least in part on the frequency hopping pattern, wherein the plurality of transmissions comprise a first number of DRS transmissions on the anchor channel frequency and a second number of transmissions on each non-anchor channel frequency, the first number being greater than or equal to the second number. The operations of block 1110 may be performed according to the methods described herein. In certain examples, aspects of the operations of block 1110 may be performed by a transmission component as described with reference to FIGS. 7 through 10.

Figure 12:
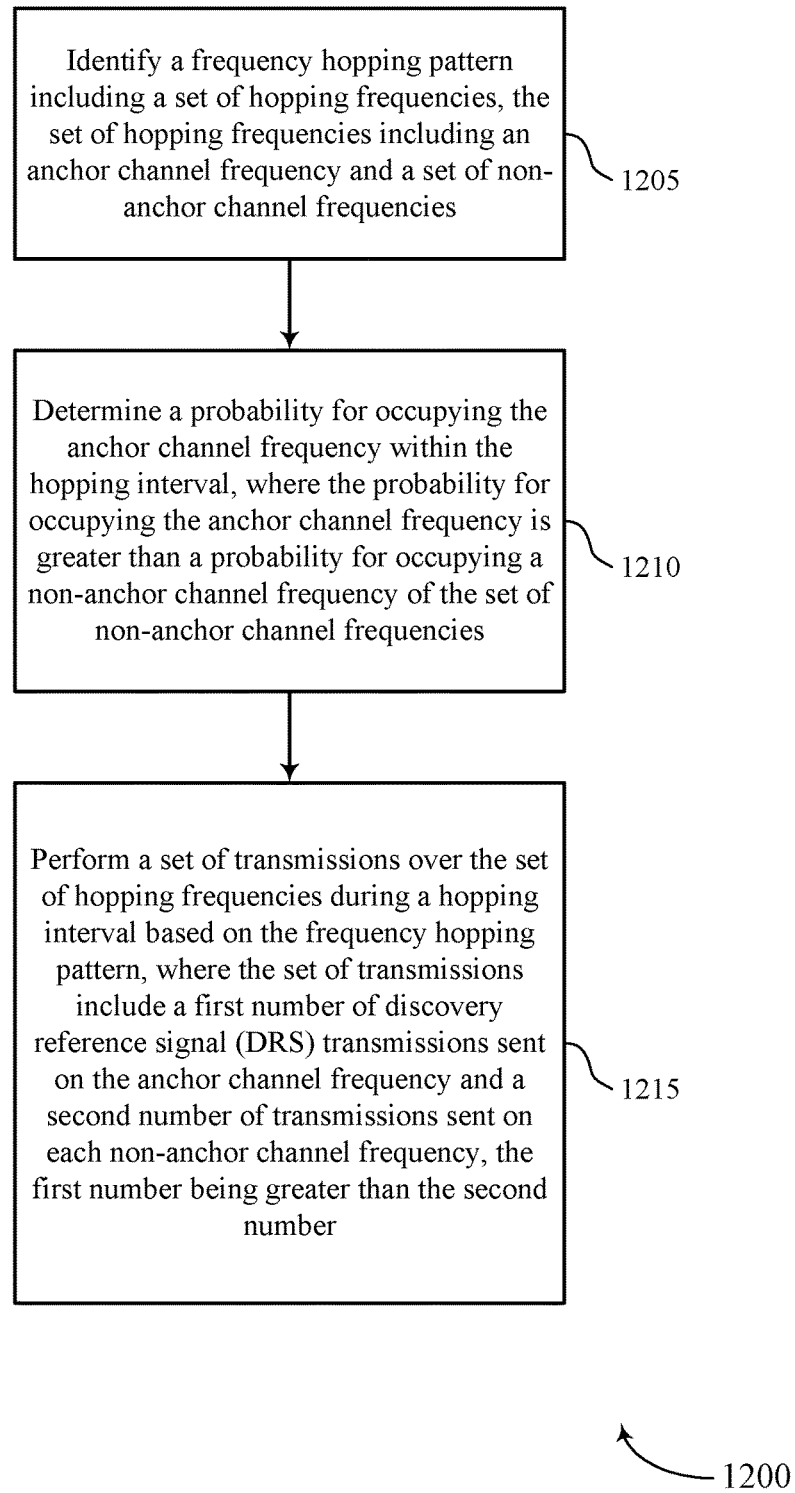

FIG. 12 shows a flowchart illustrating a method 1200 for synchronization and paging channel design for wireless communications in accordance with aspects of the present disclosure. The operations of method 1200 may be implemented by a base station 105 or a UE 115 or its components as described herein. For example, the operations of method 1200 may be performed by a communications manager as described with reference to FIGS. 7 through 10. In some examples, a base station 105 or a UE 115 may execute a set of codes to control the functional elements of the device to perform the functions described below. Additionally or alternatively, the base station 105 or a UE 115 may perform aspects of the functions described below using special-purpose hardware.

At block 1205 the base station 105 or a UE 115 may identify a frequency hopping pattern comprising a plurality of hopping frequencies, the plurality of hopping frequencies comprising an anchor channel frequency and a set of non-anchor channel frequencies. The operations of block 1205 may be performed according to the methods described herein. In certain examples, aspects of the operations of block 1205 may be performed by a hopping pattern component as described with reference to FIGS. 7 through 10.

At block 1210 the base station 105 or a UE 115 may determine a probability for occupying the anchor channel frequency within the hopping interval, wherein the probability for occupying the anchor channel frequency is greater than a probability for occupying a non-anchor channel frequency of the set of non-anchor channel frequencies. The operations of block 1210 may be performed according to the methods described herein. In certain examples, aspects of the operations of block 1210 may be performed by a probability component as described with reference to FIGS. 7 through 10.

At block 1215 the base station 105 or a UE 115 may perform a plurality of transmissions over the plurality of hopping frequencies during a hopping interval based at least in part on the frequency hopping pattern, wherein the plurality of transmissions comprise a first number of DRS transmissions on the anchor channel frequency and a second number of transmissions on each non-anchor channel frequency, the first number being greater than or equal to the second number. The operations of block 1215 may be performed according to the methods described herein. In certain examples, aspects of the operations of block 1215 may be performed by a transmission component as described with reference to FIGS. 7 through 10.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a frequency hopping pattern comprising a plurality of hopping frequencies, the plurality of hopping frequencies comprising an anchor channel frequency and a set of non-anchor channel frequencies; and
performing a plurality of transmissions over the plurality of hopping frequencies during a hopping interval based at least in part on the frequency hopping pattern, wherein the plurality of transmissions comprise a first number of discovery reference signal (DRS) transmissions sent on the anchor channel frequency and a second number of transmissions sent on each non-anchor channel frequency, the first number being greater than or equal to the second number.

2. The method of claim 1, wherein performing the plurality of transmissions comprises:
performing a DRS transmission on the anchor channel frequency after performing one or more of the second number of transmissions sent on one or more non-anchor channel frequencies.

3. The method of claim 1, further comprising:
determining a probability for occupying the anchor channel frequency within the hopping interval, wherein the probability for occupying the anchor channel frequency is greater than a probability for occupying a non-anchor channel frequency of the set of non-anchor channel frequencies.

4. The method of claim 1, wherein performing the plurality of transmissions comprises:
performing the first number of DRS transmissions sent on the anchor channel frequency according to a first time division duplex (TDD) configuration; and
performing the second number of transmissions sent on each non-anchor channel frequency according to a second TDD configuration.

5. The method of claim 1, wherein identifying the frequency hopping pattern further comprises:
coordinating the plurality of transmissions with other wireless devices, wherein the coordination is based at least in part on avoiding collisions on the anchor channel frequency.

6. The method of claim 1, wherein:
each of the first number of DRS transmissions comprises at least one of: a primary synchronization signal (PSS), a secondary synchronization signal (SSS), a physical broadcast channel (PBCH), a master information block (MIB), or a system information block (SIB).

7. The method of claim 1, wherein performing the plurality of transmissions comprises:
transmitting a paging message on the anchor channel frequency.

8. The method of claim 7, further comprising:
receiving a paging response from a wireless device on the anchor channel frequency, the paging response based at least in part on the paging message.

9. The method of claim 1, wherein performing the plurality of transmissions comprises:
transmitting, to a wireless device, position information during an uplink time interval on the anchor channel frequency.

10. The method of claim 1, further comprising:
receiving, from a wireless device, position information during a downlink time interval on the anchor channel frequency.

11. The method of claim 1, further comprising:
performing a measurement of a neighboring cell using the anchor channel frequency; and
adjusting a radio resource management (RRM) parameter based at least in part on the measurement of the neighboring cell.

12. The method of claim 1, wherein:
a transmission duration associated with the anchor channel frequency is less than a transmission duration associated with the set of non-anchor channel frequencies.

13. The method of claim 1, further comprising:
indicating, using transmissions via the anchor channel frequency, at least one non-anchor channel frequency of the set of non-anchor channel frequencies, a hop duration for the at least one non-anchor channel frequency of the set of non-anchor channel frequencies, and a location of the anchor channel frequency with respect to the at least one non-anchor channel frequency of the set of non-anchor channel frequencies.

14. The method of claim 13, wherein:
a channel frequency occupation duration is based at least in part on whether a listen before talk (LBT) procedure is performed on a channel prior to the performing transmissions.

15. The method of claim 1, further comprising:
performing a listen before talk (LBT) procedure prior to performing transmissions sent on a non-anchor channel frequency of the set of non-anchor channel frequencies.

16. The method of claim 1, wherein:
the transmissions performed via the anchor channel frequency comprise an indication of random access channel (RACH) resources.

17. The method of claim 1, wherein:
a bandwidth associated with the anchor channel frequency is less than a bandwidth associated with the set of non-anchor channel frequencies.

18. The method of claim 17, wherein:
the bandwidth associated with the anchor channel frequency comprises a guardband.

19. An apparatus for wireless communication, comprising:
means for identifying a frequency hopping pattern comprising a plurality of hopping frequencies, the plurality of hopping frequencies comprising an anchor channel frequency and a set of non-anchor channel frequencies; and
means for performing a plurality of transmissions over the plurality of hopping frequencies during a hopping interval based at least in part on the frequency hopping pattern, wherein the plurality of transmissions comprise a first number of discovery reference signal (DRS) transmissions on the anchor channel frequency and a second number of transmissions on each non-anchor channel frequency, the first number being greater than or equal to the second number.

20. An apparatus for wireless communication, comprising:
a processor;
memory in electronic communication with the processor; and
instructions stored in the memory, wherein the instructions are executable by the processor to:
identify a frequency hopping pattern comprising a plurality of hopping frequencies, the plurality of hopping frequencies comprising an anchor channel frequency and a set of non-anchor channel frequencies; and
perform a plurality of transmissions over the plurality of hopping frequencies during a hopping interval based at least in part on the frequency hopping pattern, wherein the plurality of transmissions comprise a first number of discovery reference signal (DRS) transmissions sent on the anchor channel frequency and a second number of transmissions sent on each non-anchor channel frequency, the first number being greater than or equal to the second number.

21. The apparatus of claim 20, wherein the instructions are further executable by the processor to:
perform a DRS transmission on the anchor channel frequency after performing one or more of the second number of sent transmissions on one or more non-anchor channel frequencies.

22. The apparatus of claim 20, wherein the instructions are further executable by the processor to:
determine a probability for occupying the anchor channel frequency within the hopping interval, wherein the probability for occupying the anchor channel frequency is greater than a probability for occupying a non-anchor channel frequency of the set of non-anchor channel frequencies.

23. The apparatus of claim 20, wherein the instructions are further executable by the processor to:
perform the first number of DRS transmissions sent on the anchor channel frequency according to a first time division duplex (TDD) configuration; and
perform the second number of transmissions sent on each non-anchor channel frequency according to a second TDD configuration.

24. The apparatus of claim 20, wherein the instructions are further executable by the processor to:
coordinate the plurality of transmissions with other wireless devices, wherein the coordination is based at least in part on avoiding collisions on the anchor channel frequency.

25. The apparatus of claim 20, wherein:
each of the first number of DRS transmissions comprises at least one of: a primary synchronization signal (PSS), a secondary synchronization signal (SSS), a physical broadcast channel (PBCH), a master information block (MIB), or a system information block (SIB).

26. The apparatus of claim 20, wherein the instructions are further executable by the processor to:
transmit a paging message on the anchor channel frequency.

27. The apparatus of claim 26, wherein the instructions are further executable by the processor to:
receive a paging response from a wireless device on the anchor channel frequency, the paging response based at least in part on the paging message.

28. The apparatus of claim 20, wherein the instructions are further executable by the processor to:
receive, from a wireless device, position information during a downlink time interval on the anchor channel frequency.

29. The apparatus of claim 20, wherein:
a transmission duration associated with the anchor channel frequency is less than a transmission duration associated with the set of non-anchor channel frequencies.

30. A non-transitory computer readable medium storing code for wireless communication, the code comprising instructions executable by a processor to:
identify a frequency hopping pattern comprising a plurality of hopping frequencies, the plurality of hopping frequencies comprising an anchor channel frequency and a set of non-anchor channel frequencies; and
perform a plurality of transmissions over the plurality of hopping frequencies during a hopping interval based at least in part on the frequency hopping pattern, wherein the plurality of transmissions comprise a first number of discovery reference signal (DRS) transmissions on the anchor channel frequency and a second number of transmissions on each non-anchor channel frequency, the first number being greater than or equal to the second number.

* * * * *